United States Patent [19]

Sansing, Jr. et al.

[11] 3,930,832
[45] Jan. 6, 1976

[54] INHIBITION OF CORROSIVE ACTION OF ZINC-CONTAINING FERTILIZER SOLUTIONS

[75] Inventors: James Earl Sansing, Jr.; Joseph Novotny, both of Baton Rouge, La.

[73] Assignee: Allied Chemical Corporation, New York, N.Y.

[22] Filed: Apr. 21, 1975

[21] Appl. No.: 570,102

[52] U.S. Cl............................. 71/30; 71/58; 71/64 C; 21/2.7 R; 252/389 R
[51] Int. Cl.².............................................. C05C 9/00
[58] Field of Search ............. 21/2.7 R; 71/1, 28, 30, 71/31, 58, 64 C; 252/389 R

[56] References Cited
UNITED STATES PATENTS

| | | | |
|---|---|---|---|
| 3,419,379 | 12/1968 | Goodale et al. | 71/58 |
| 3,714,067 | 1/1973 | King et al. | 252/389 R |
| 3,718,603 | 2/1973 | Mitchell | 252/389 R |
| 3,723,347 | 3/1973 | Mitchell | 21/2.7 R |
| 3,753,675 | 8/1973 | Young | 71/1 |
| 3,816,333 | 6/1974 | King et al. | 252/389 R |
| 3,877,085 | 3/1959 | George et al. | 21/2.7 R |

*Primary Examiner*—Charles N. Hart
*Assistant Examiner*—Ernest G. Therkorn
*Attorney, Agent, or Firm*—Fred L. Kelly

[57] ABSTRACT

Corrosion of carbon steel by an aqueous solution of zinc nitrate, ammonium nitrate, and urea is inhibited by incorporating therein an effective amount of ammonium thiosulfate. The solution is particularly useful in correcting zinc deficiencies in plants when applied as a foliar spray.

20 Claims, No Drawings

INHIBITION OF CORROSIVE ACTION OF ZINC-CONTAINING FERTILIZER SOLUTIONS

CROSS-REFERENCES TO RELATED APPLICATIONS

This application is related to U.S. application Ser. No. 553,953, filed Feb. 28, 1975, on "Zinc-Containing Foliar Spray".

BACKGROUND OF THE INVENTION

This invention relates to a fertilizer solution comprising zinc nitrate, ammonium nitrate and urea in aqueous solution; in particular, it relates to the inhibition of the corrosive action thereof on carbon steel.

The use of micronutrients as fertilizers is experiencing increased use. The elements such as zinc, manganese, boron, copper, molybdenum and iron are fully as important as the primary nutrients, nitrogen, phosphorus, and potassium, although the former are used in much smaller quantities. Agronomic tests in a large number of states have been concerned with establishing where the need for micronutrients exists, comparing sources and carriers and indicating amounts that may be needed.

It is now known that plants growing on soils having pH values over 7.0 usually suffer from lack of zinc availability in the soil due to the presence of various calcium compounds. Therefore, zinc is usually supplied to the plants by foliar means. However, foliar application of zinc compositions has been the subject of considerable research in recent years because of relatively low absorption of the micronutrient by the leaves of the plant. The most effective zinc composition discovered to date is described in U.S. application Ser. No. 553,953, filed Feb. 28, 1975, by Dr. James Benton Storey.

Said Storey application discloses that an aqueous solution containing a specified mixture of zinc nitrate, ammonium nitrate, and urea is surprisingly effective in correcting zinc deficiencies in pecan and other plants when applied as a foliar treatment. Unfortunately, these mixtures are extremely corrosive to the common steel equipment generally used in transporting and applying foliar spray solutions. Moreover, none of the common materials used to inhibit corrosion by fertilizer solutions such as phosphates, chromates, and borates, are satisfactory for use with these mixtures. Accordingly, an effective corrosion inhibitor is urgently needed. Desirably, the corrosion inhibitor should reduce corrosion to 1 to 10 mils per year or less; it should be in water-soluble form for easy mixing with the aqueous zinc-containing foliar spray solution; and it should not cause environmental problems upon use.

SUMMARY OF THE INVENTION

One object of the present invention is to provide an aqueous solution comprising zinc nitrate, ammonium nitrate, and urea, which solution contains a corrosion inhibitor for protection of carbon steel.

Another object of the present invention is to provide a zinc nitrate—ammonium nitrate-urea foliar spray solution containing a corrosion inhibitor for protection of carbon steel, which inhibitor is not detrimental to environmental quality.

A further object of the invention is to provide an aqueous zinc nitrate-ammonium nitrate-urea foliar spray concentrate of low corrosiveness toward carbon steel, which concentrate when added to water produces a highly effective zinc-containing foliar spray for use in prevention or control of zinc deficiencies in pecan and other plants.

Briefly stated, the process of our invention comprises incorporating in an aqueous zinc nitrate-ammonium nitrate-urea solution containing at least 8 percent by weight zinc nitrate, at least 14 percent by weight ammonium nitrate, at least 10 percent by weight urea, and the balance substantially consisting of water, about 0.1 to 5 percent by weight of a water-soluble thiosulfate compound selected from the group consisting of ammonium thiosulfate, sodium thiosulfate, and potassium thiosulfate. The resulting solution is a new composition of matter of low corrosiveness toward carbon steel because of the presence of the thiosulfate compound. For use as a foliar spray, the relatively concentrated solution is diluted with water, preferably to a concentration of about 0.1 to 0.2 percent by weight of zinc nitrate.

DESCRIPTION OF THE PREFERRED EMBODIMENT

Our preferred process for controlling corrosiveness to carbon steel of a solution of zinc nitrate, ammonium nitrate, and urea in water, said solution containing 12 to 20 percent by weight of zinc nitrate, 21 to 30 percent by weight of ammonium nitrate, 15 to 23 percent by weight of urea, and the balance consisting essentially of water, comprises incorporating in said solution about 0.1 to 0.5 percent by weight of a water-soluble thiosulfate compound selected from the group consisting of ammonium thiosulfate, sodium thiosulfate and potassium thiosulfate. Solutions thus prepared contain as essential ingredients zinc nitrate, ammonium nitrate, urea, water, and the thiosulfate, and permissibly contain additional fertilizer materials such as sodium nitrate. For improved stability of the solutions in storage, sufficient ammonia may be added to adjust the pH of the solution to about pH 4–5.

In order to demonstrate the invention, the following examples are given. These examples show that the presence of the thiosulfate compound in the aqueous zinc nitrate-ammonium nitrate-urea solutions serves to protect against corrosion carbon steels which are attacked by these solutions. Carbon steels commonly used in equipment for handling fertilizer solutions which are protected against corrosion by our invention include Carbon Steel 7-CT and Carbon Steel 7-285.

EXAMPLE 1

A fertilizer solution containing 21 percent by weight of urea, 28 percent by weight of ammonium nitrate, 16 percent by weight of zinc nitrate, and 35 percent by weight of water was prepared. In this example no corrosion inhibitor was added. Corrosivity of the solution was determined by suspending weighed and measured coupons of carbon steel in the solution at room temperature in lightly capped bottles. At the end of 30 days contact with the solution, the rate of corrosion in mils per year average penetration were determined from the loss of weight of the metal. The fertilizer solution with no added inhibitor gave a rate of 95 mils per year.

EXAMPLE 2

The fertilizer solution of Example 1 was inhibited by adding 0.15 percent by weight of ammonium thiosulfate based on the total weight of the solution, and corrosivity was determined as in Example 1. The inhibited fertilizer solution gave a corrosion rate of only 0.3 mils per year, and the solution remained clear during the 30 day test. Similar results are obtained when sodium thiosulfate and potassium thiosulfate are substituted for the ammonium thiosulfate.

EXAMPLE 3

A fertilizer solution containing 21 percent by weight of urea, 28 percent by weight of ammonium nitrate, 17.5 weight percent of zinc nitrate, and 33.5 weight percent of water was prepared. A portion of this solution was kept uninhibited while another portion was inhibited with 0.25 weight percent ammonium thiosulfate based on the total weight of the solution. The corrosivity of the inhibited and uninhibited solutions was determined both in a static test as in Example 1 and in a dynamic test where the solution was stirred so as to give about 3 feet per second linear velocity of the liquid passing the metal surface (a more severe corrosion test). Results of the tests are as follows for Carbon Steel 7-CT and Carbon Steel 7-285.

| Fertilizer Solution | Carbon Steel 7-CT | |
|---|---|---|
| | Static Test | Dynamic Test |
| Uninhibited | 94 | 390 |
| Inhibited | 1 | 2.5 |
| | Carbon Steel 7-285 | |
| Uninhibited | 140 | 400 |
| Inhibited | 5 | 8 |

EXAMPLE 4

This example shows that phosphate and chromate are not suitable as corrosion inhibitors for the instant solutions, although they are commonly used to inhibit corrosion by fertilizer solutions, for example, fertilizer solutions containing ammonium nitrate and urea.

The fertilizer solution of Example 1 was mixed with 0.15 percent by weight of ammonium phosphate based on the total weight of the solution and corrosivity of the resulting solution was determined as in Example 1. The phosphate-containing solution corroded carbon steel at the rate of 75 mils per year. In addition, after three days of exposure of the carbon steel coupon, the test solution developed a voluminous precipitate of iron hydroxide.

In a similar test using 0.10 percent by weight of sodium dichromate instead of the ammonium phosphate, the chromate-containing solution gave a corrosion rate of 100 mils per year and also developed iron hydroxide.

EXAMPLE 5

This example demonstrates dilution of the concentrated aqueous zinc nitrate-ammonium nitrate-urea fertilizer solution with water to provide a foliar spray solution.

The ammonium thiosulfate-containing fertilizer solution of Example 2 is diluted with sufficient water to provide a foliar spray solution containing about 0.18 weight percent of zinc nitrate. The resulting diluted zinc nitrate-ammonium nitrate-urea solution is used as a foliar spray to treat pecan trees suffering from severe zinc deficiency.

Pecan trees suffering from severe zinc deficiency are characterized by rosette and die-back. More subtle symptoms, however, such as smaller than average leaves, reduced yields and pronounced alternate bearing are more commonly experienced.

Zinc is not available to pecan roots in soil high in calcium carbonate in quantities sufficient to insure normal pecan tree growth development. Even though zinc may be abundant in calcareous soils, trees may suffer from lack of zinc because it is in the form of insoluble compounds such as zinc carbonate. Therefore, zinc is usually supplied by foliar means. Best application times seem to be as buds are breaking, one week later, 2 weeks later, and then at about three week intervals until shoot elongation has ceased. About 1.25 acres may be sprayed with about 500 gallons of the instant dilute foliar spray solution containing about 0.18 weight percent of zinc nitrate.

We claim:

1. A process of preparing a zinc-containing fertilizer solution of low corrosiveness toward carbon steel which comprises incorporating in an aqueous zinc nitrate-ammonium nitrate-urea solution containing at least 8 percent by weight zinc nitrate, at least 14 percent by weight ammonium nitrate, at least 10 percent by weight urea, and the balance substantially consisting of water, about 0.1 to 5 percent by weight of a water-soluble thiosulfate compound selected from the group consisting of ammonium thiosulfate, sodium thiosulfate, and potassium thiosulfate.

2. The process of claim 1 wherein the thiosulfate compound is ammonium thiosulfate.

3. The process of claim 1 wherein the thiosulfate compound is sodium thiosulfate.

4. The process of claim 1 wherein the thiosulfate compound is potassium thiosulfate.

5. The process of claim 1 wherein the solution is diluted with sufficient water to provide a foliar spray solution containing about 0.1 to 0.2 weight percent of zinc nitrate.

6. A process for controlling corrosiveness to carbon steel of a solution of zinc nitrate, ammonium nitrate, and urea in water, said solution containing 12 to 20 percent by weight of zinc nitrate, 21 to 30 percent by weight of ammonium nitrate, 15 to 23 percent by weight of urea, and the balance consisting essentially of water, comprising incorporating in said solution about 0.1 to 0.5 percent by weight of a water-soluble thiosulfate compound selected from the group consisting of ammonium thiosulfate, sodium thiosulfate and potassium thiosulfate.

7. The process of claim 6 wherein the thiosulfate compound is ammonium thiosulfate.

8. The process of claim 6 wherein the thiosulfate compound is sodium thiosulfate.

9. The process of claim 6 wherein the thiosulfate compound is potassium thiosulfate.

10. The process of claim 6 wherein the solution is diluted with sufficient water to provide a foliar spray solution containing about 0.1 to 0.2 weight percent of zinc nitrate.

11. As a new composition of matter of low corrosiveness to carbon steel, an aqueous zinc nitrate-ammonium nitrate-urea solution consisting essentially of at least 8 percent by weight zinc nitrate, at least 14 percent by weight ammonium nitrate, at least 10 percent by weight urea, about 0.1 to 5 percent by weight of a water-soluble thiosulfate compound selected from the group consisting of ammonium thiosulfate, sodium thiosulfate, and potassium thiosulfate, and the balance substantially consisting of water.

12. The composition of claim 11 wherein the thiosulfate compound is ammonium thiosulfate.

13. The composition of claim 11 wherein the thiosulfate compound is sodium thiosulfate.

14. The composition of claim 11 wherein the thiosulfate compound is potassium thiosulfate.

15. The composition of claim 11 wherein sufficient ammonia is incorporated to adjust the pH of the composition to pH 4–5.

16. As a new composition of matter of low corrosiveness to carbon steel, a solution of zinc nitrate, ammonium nitrate, and urea in water, said solution consisting essentially of 12 to 20 percent by weight of zinc nitrate, 21 to 30 percent by weight of ammonium nitrate, 15 to 23 percent by weight of urea, 0.1 to 0.5 percent by weight of a water-soluble thiosulfate compound selected from the group consisting of ammonium thiosulfate, sodium thiosulfate and potassium thiosulfate, and the balance consisting essentially of water.

17. The composition of claim 16 wherein the thiosulfate compound is ammonium thiosulfate.

18. The composition of claim 16 wherein the thiosulfate compound is sodium thiosulfate.

19. The composition of claim 16 wherein the thiosulfate compound is potasium thiosulfate.

20. The composition of claim 16 wherein sufficient ammonia is incorporated to adjust the pH of the composition to pH 4–5.

* * * * *